(12) United States Patent
Branover et al.

(10) Patent No.: US 7,870,407 B2
(45) Date of Patent: Jan. 11, 2011

(54) DYNAMIC PROCESSOR POWER MANAGEMENT DEVICE AND METHOD THEREOF

(75) Inventors: Alex Branover, Brookline, MA (US); Frank P. Helms, Austin, TX (US); Jonathan M. Owen, Northboro, MA (US); Kurt Lewchuk, Austin, TX (US); Maurice Steinman, Marlborough, MA (US); Paul Mackey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 760 days.

(21) Appl. No.: 11/750,365

(22) Filed: May 18, 2007

(65) Prior Publication Data

US 2008/0288799 A1    Nov. 20, 2008

(51) Int. Cl.
 *G06F 1/32* (2006.01)
(52) U.S. Cl. ............... 713/323; 713/300; 713/310; 713/320; 713/330
(58) Field of Classification Search ......... 713/300, 713/322, 323, 310, 320, 330
 See application file for complete search history.

(56) References Cited

U.S. PATENT DOCUMENTS

| | | | |
|---|---|---|---|
| 5,396,635 A | | 3/1995 | Fung |
| 5,884,088 A * | | 3/1999 | Kardach et al. ............. 713/324 |
| 6,000,035 A * | | 12/1999 | Matsushima et al. ........ 713/320 |
| 6,018,803 A * | | 1/2000 | Kardach .................... 713/323 |
| 6,161,187 A * | | 12/2000 | Mason et al. ............... 713/322 |
| 6,240,521 B1 * | | 5/2001 | Barber et al. .............. 713/323 |
| 6,754,837 B1 * | | 6/2004 | Helms ........................ 713/322 |
| 6,816,977 B2 * | | 11/2004 | Brakmo et al. ............. 713/323 |
| 7,036,031 B2 * | | 4/2006 | Takeuchi .................... 713/323 |
| 7,133,944 B2 * | | 11/2006 | Song et al. .................. 710/100 |
| 7,337,335 B2 * | | 2/2008 | Jorgenson et al. .......... 713/300 |
| 7,493,440 B2 * | | 2/2009 | Song et al. .................. 710/305 |
| 7,689,849 B2 * | | 3/2010 | Sokorac ...................... 713/323 |
| 2004/0128416 A1 * | | 7/2004 | Kurts et al. ................ 710/107 |
| 2004/0255176 A1 | | 12/2004 | George et al. |
| 2005/0138442 A1 * | | 6/2005 | Keller et al. ............... 713/300 |
| 2006/0136763 A1 * | | 6/2006 | Jorgenson et al. .......... 713/322 |
| 2007/0016812 A1 * | | 1/2007 | Song et al. .................. 713/300 |
| 2008/0263377 A1 * | | 10/2008 | Jorgenson et al. .......... 713/322 |

OTHER PUBLICATIONS

International Search Report for PCT/US2008/006294 dated Sep. 23, 2009, 16 pages.

* cited by examiner

*Primary Examiner*—Thomas Lee
*Assistant Examiner*—Zahid Choudhury

(57) ABSTRACT

A processor can operate in different power modes. In an active power mode, the processor executes software. In response to receiving a halt indication from the software, hardware at the processor evaluates bus transactions for the processor. If the bus transactions meet a heuristic, hardware places a processor core in a lower power mode, such as a retention mode. Because the bus transactions are evaluated by hardware, rather than by software, and the software is not required to perform handshakes and other protocols to place the processor in the lower power mode, the processor is able to place the processor core into the lower power mode more quickly, thereby conserving power.

17 Claims, 6 Drawing Sheets

DYNAMIC PROCESSOR POWER MANAGEMENT DEVICE AND METHOD THEREOF

FIELD OF THE DISCLOSURE

The present disclosure relates to integrated circuit devices and more particularly to power management for integrated circuit devices.

BACKGROUND

Some integrated circuit devices, such as data processor cores, can operate in multiple power modes, such as an active or normal power mode and a lower power mode. In an active power mode, a voltage regulator provides a voltage to the processor core that allows the processor core to execute instructions at a normal rate and perform normal operations. In the lower power mode, the voltage regulator provides a retention voltage to the processor core that allows the processor to retain its internal state, but not execute instructions at a normal rate or perform other normal operations. The retention voltage is lower than the voltage provided in the active power mode, thereby allowing the processor core to conserve power. The processor core can enter the low power mode to conserve power while retaining its internal state and retain data stored in memory so that when it returns to the active power mode it is able to continue operations from the state it had when it entered the lower power mode.

An operating system can cause the processor core to enter the lower power mode when certain conditions are met, such as when there are no pending operations at the processor core and no pending operations on the processor bus. However, the accuracy with which the operating system can monitor the conditions is sometimes low. Furthermore, the rate at which the operating system can implement a lower power mode can cause the processor core to remain in the active power mode longer and consume more power than is desirable. Accordingly, there is a need for an improved technique of power management for an integrated circuit device.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A processor that can operate in different power modes is disclosed. In an active power mode, the processor executes software. In response to receiving a halt indication from the software, hardware at the processor evaluates bus transactions for the processor. If the bus transactions meet a heuristic, hardware places a processor core in a lower power mode, such as a retention mode. Because the bus transactions are evaluated by hardware, rather than by software, and the software is not required to perform handshakes and other protocols to place the processor in the lower power mode, the processor is able to place the processor core into the lower power mode more quickly, thereby conserving power.

Figure 1:
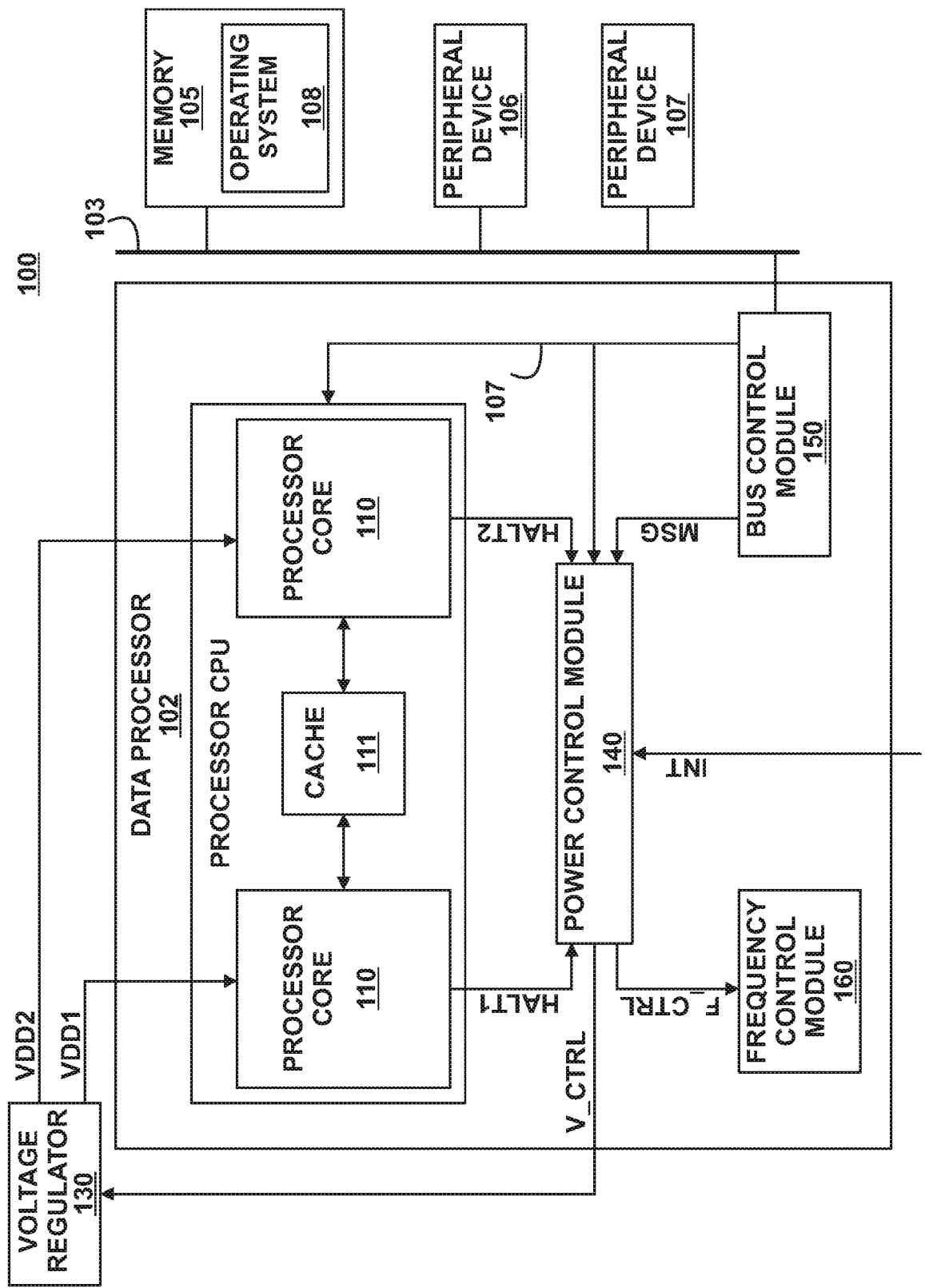
FIG. 1 is a block diagram of a particular embodiment of a processing device.

Referring to FIG. 1, a block diagram of a particular embodiment of a integrated circuit device 100 is illustrated. The integrated circuit device 100 includes a data processor 102, a bus 103, a memory 105, a peripheral device 106, a peripheral device 107, and a voltage regulator 130.

The data processor 102 can includes a general purpose or application specific microprocessor core, peripheral devices integrated in a common substrate, such as memory devices, I/O devices, an other general purpose and dedicated data processors. The data processor 102 includes an input configured to receive an interrupt signal, labeled INT and an output configured to provide a signal, labeled V_CTRL, to provide information indicating a voltage level for one or more processor cores of the data processor 102. The data processor 102 also includes a voltage reference input node to receive a voltage VDD1 and a voltage reference input node to receive a voltage VDD2. The data processor 102 is further connected to the bus 103.

The memory 105 can be a volatile or non-volatile memory such as DRAM, SRAM, flash memory, and the like. The memory 105 is connected to the bus 103. In one embodiment, the memory 105 is configured to operate in two modes. In an active power mode, the memory 105 is configured to execute read and write requests from the data processor 102 and the peripheral devices 106 and 107. In a self-refresh mode, the memory 105 is configured to maintain stored data, but not to execute read and write requests. The memory 105 consumes less power in the self-refresh mode than in the active power mode. The peripheral devices 106 and 107 can be can each be a memory controller, input/output controller, peripheral controller, and the like. The peripheral devices 106 and 107 each include a connection to the bus 103.

The voltage regulator 130 includes an input configured to receive the signal V_CTRL, and 2 or more outputs configured to provide a plurality of voltages, including VDD1 and VDD2 based on the signal V_CTRL.

Each of the illustrated portions of the data processing device 100 can be integrated on a common semiconductor substrate, or be located on different substrates. For example, the data processor 102 and the memory 105 can be integrated on a common semiconductor substrate, with the peripheral devices 106 and 107 located external to that semiconductor substrate. In the illustrated embodiment, the voltage regulator 130 is located external to the data processor 102. In other embodiments, the voltage regulator 130 can be implemented internal to the data processor 102.

The data processor 102 includes a central processing unit (CPU) having a processor core 110, a processor core 120, and a cache 111. During operation, the processor cores 110 and 120 and the cache 111 can each operate in a plurality of power modes, including in an active power mode, and a number of lower-power modes. The lower-power modes are modes that consume less power than the active power mode. In the low-power modes the processor cores 110 and 120 operate at lower clock frequencies, lower operating voltages, or both. Further, in the lower-power modes the processor cores 110 and 120 do not execute instructions or execute instructions at lower speeds relative to the active power mode. For purposes of discussion, it is assumed that the processor cores 110 and 120 can operate in at least three power modes, including an active power mode, a low-power retention mode, and a low-power processing mode.

In the active power mode, the processor cores 110 and 120 can execute software, such as the operating system 108 stored at the memory 105, and perform other normal operations. In the low-power retention mode, the processor cores 110 and 120 and the cache 111 are placed in a retention state, so that the state of the processor core and data stored in the cache 111 is retained. In the low-power retention mode the processor cores 110 and 120 cannot execute instructions or perform other normal operations at a normal rate. In the low-power processing mode, the processor cores 110 and 120 are able to process cache messages provided by the peripheral devices 106 and 107 via the bus 103. The cache messages represent requests for the processor cores 110 and 120 to process cache transactions, such as coherency transactions or access transactions for the cache 111. The processor cores 110 and 120 process the cache message by analyzing the cache message and, when appropriate, performing the requested cache transaction. In addition, in the low-power processing mode the processor cores 110 and 120 are able to process interrupts from the peripheral devices 106 and 107 at a lower speed than in the active power mode. The mode of the processor cores 110 and 120 are independent. For example, the processor core 110 can be in an active power mode when the processor core 120 is in a low-power retention mode.

The voltage regulator 130 provides a different level of the operating voltage VDD1 and VDD2 for each of the three power modes. For example, to place the processor core 110 in the active power mode, the operating voltage VDD1 is set to the active voltage level. To place the processor core 110 in the low-power processing mode, the operating voltage VDD1 is set to the low-power processing voltage level, which is lower than the active voltage level. This voltage level allows the processor core 110 to process cache messages and process interrupts at a low speed relative to performance of operations in the active power mode. To place the processor core 110 in the low-power retention mode, the operating voltage VDD1 is set to a retention voltage, so that the processor core 110 is able to retain state information but cannot execute instructions. The retention voltage is lower than the low-power processing voltage. In a particular embodiment, the retention voltage is about 0.7 volts, the low-power processing voltage is between about 0.75 and about 0.8 volts, and the active voltage is about 1.1 volts. The processor core 120 can be placed in each of the three modes by setting the voltage VDD2 to the appropriate level.

In a particular embodiment, different portions of the processor core 110 can be placed in different power states. For example, in the low-power processing mode, portions of the processor core 110, such as an instruction pipeline, can remain in a retention state while other portions, including the cache 111, can be placed in a processing state to process cache messages. Accordingly, the illustrated voltage VDD1 can include multiple signals to set the operating voltage for different portions of the processor core 110.

In addition to the processor core 110 and the processor core 120, the data processor 102 includes power control module 140, a bus control module 150, a bus 107 and a frequency control module 160. The processor core 110 includes an output to provide a signal HALT1 and the processor core 120 includes an output to provide the signal HALT2. The power control module 140 includes an input to receive the signal HALT1, an input to receive the signal HALT2, an input to receive the signal INT, an input connected to the bus 107, an input to receive a signal MSG, an output to provide the signal V_CTRL, and an output to provide a signal F_CTRL. The bus control module 150 includes a connection to the bus 103, an output to provide the signal MSG, and an output connected to the bus 107. The frequency control module 160 includes an input to receive the signal F_CTRL.

The bus control module 150 is configured to monitor bus transactions on the bus 103 and provide information about the bus transactions via the signals MSG and MSG. The bus control module 150 can provide information indicating the type of transaction, such as whether the transaction is a coherent transaction or an incoherent transaction, and whether the transaction is associated with the processor core 110 or the processor core 120. The bus control module 150 is also configured to provide the monitored bus transactions to the processor CPU via the bus 107.

The frequency control module 160 is configured to receive information via the F_CTRL signal and set the clock frequency for the processor core 110, the processor core 120, and other clock frequencies for clocks of the data processor 102. The frequency control module 160 is configured so that the clock frequencies can be set individually and independent of each other.

The power control module 140 is configured to receive information via the signal MSG and to evaluate bus transactions on the bus 107 provided by the bus control module 150. The power control module 140 is further configures to provide control information via the signal V_CTRL based on the received information an on the evaluation of the bus transaction. Accordingly, the power control module 140 controls the modes of operation of the processor cores 110 and 120. In addition, the power control module 140 is configured to determine if the memory 105 or the cache 111 is likely to be accessed in a specified period of time, and to issue control information based on this determination to control the operating mode of the memory 105 and the cache 111.

During operation, the power control module 140 can receive halt indications issued by the operating system 108 from the processor cores 110 and 120 via the signals HALT1 and HALT2 respectively. It will be appreciated that although the HALT1 and HALT2 are illustrated as signals, the operating system 108 can issue the halt indications by writing to registers at the power control module 140. In a particular embodiment, after issuing the halt indication, the operating system 108 enters an idle state on the processor core that provided the halt indication. In the idle state the operating system does not execute operations or tasks.

In response to receiving a halt indication, the power control module 140 evaluates whether bus transactions on the bus 103 meet a heuristic. For example, in response to assertion of the HALT1 signal the power control module 140 can determine whether there are no bus transactions on the bus 103 associated with the processor core 110 for a particular interval of time. In another embodiment, the power control module 140 can determine, based on indications from the peripheral devices 106 and 107, whether any bus transactions are expected on the bus 103 for a particular period of time. If no bus transactions are expected, the heuristic is met.

If the power control module 140 determines that the heuristic is met, it provides information via the V_CTRL signal to set the voltage level for the processor core that issued the halt indication to a lower voltage, such as the low-power retention voltage. Thus, the power control module 140 can place the processor core in a lower-power mode without further intervention or processing by the operating system 108. This allows the processor core to be placed in the lower-power mode more rapidly and more frequently, thereby conserving power. If the power control module 140 receives an interrupt via the INT signal while it is determining whether the heuristic is met, it can stop determining whether a specific heuristic is met and maintain the voltage for the processor core at the active voltage level.

In addition, if the voltage for one of the processor cores 110 and 120 is set to the retention voltage, and an interrupt is received as indicated by the signal INT, the power control module 140 can set the voltage level for the processor core to the low-power processing voltage to further service the interrupt before determining whether the processor core should go to the active power mode so that the interrupt can be processed. If the processor core 110 or the processor core 120 returns to the active mode, the operating system 108 will exit the idle mode to process the interrupt.

In addition, the power control module 140 provides information via the signal F_CTRL to control frequencies of the clocks associated with the processor core 110 and the processor core 120 in each mode. For example, when the power control module 140 sets the voltage VDD1 to allow the processor core 110 to operate in the active power mode, it also provides information via the F_CTRL signal to set the clock frequency 120 to a frequency level so that the operating system 108 is executed at normal speeds. In the low-power retention mode, the power control module 140 can shut down the clock for the processor core 110. Further, when the processor core 110 is in the low-power processing mode, the power control module 140 can set the clock at a frequency that allows the processor core 110 to process data at a reduced rate to facilitate handling of cache messages or interrupts, but a lower frequency than the clock frequency associated with the active power mode. By controlling the clock frequency, the power control module 140 further controls the power consumption of the data processor 102 in each operating mode.

The power control module 140 can also control the operating mode of the cache 111 by sending control information to the memory the bus 107. For example, in response to the power control module 140 determining that the cache 111 is unlikely to be accessed for a specified period of time, the power control module 140 sends control information to place the cache 111 in a self-refresh or a low-power retention state. In a particular embodiment, the power control module places the cache 111 in the self-refresh or low-power retention state only when one or both of the processor cores 110 and 112 are in the low-power retention mode. The determination to place the cache 111 in the self-refresh mode is performed by hardware at the data processor 102, rather than directly by the operating system 108. This allows the data processor 102 to place the memory in self-refresh mode more quickly, thereby conserving power.

In addition, the power control module 140 can similarly control the operating mode of the memory 105 by sending control information over the bus 103. For example, in response to the power control module 140 determining that the memory 105 is unlikely to be accessed for a specified period of time, the power control module 140 sends control information to place the memory 105 in a self-refresh state.

Figure 2:
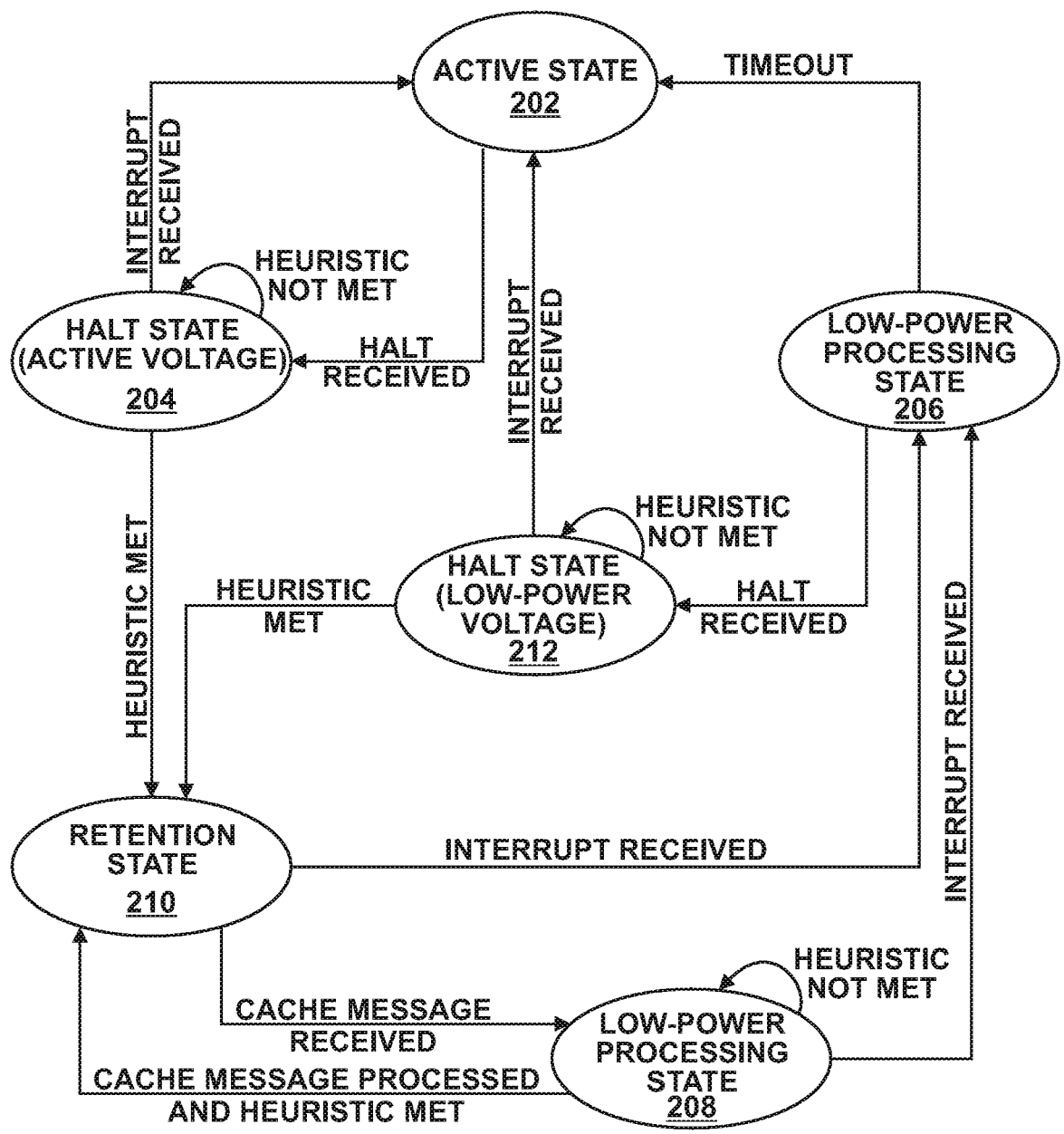
FIG. 2 is a diagram illustrating a particular embodiment of states of a processor core of FIG. 1.

A specific operational embodiment of the integrated circuit device 100 may be better understood with reference to FIG. 2, which illustrates a state diagram related to power modes of the processor core 110. At node 202, a voltage sufficient to support the active power mode (i.e. an active voltage) is provided to the processor core 110, placing it in an active state. At node 202, the processor core 110 is in a state where it can execute the operating system 108 at normal speed. In response to the operating system 108 providing a halt indication, the processor core transitions to node 204, which is a low-power enabled state. As illustrated, in the low-power enabled state at node 204, the active voltage is provided to the processor core 110. In addition, in the low power enable state at node 204 the operating system 108 is placed in an idle mode and does not perform additional operations or functions until the processor core 110 returns to the active mode at node 202.

In the low-power enabled state at node 204 the data processor 102 evaluates bus transactions on the bus 103. If a heuristic, such as an absence of bus transactions for a particular period of time, is not met the processor core 110 remains in the low-power enable at node 204. If an interrupt is received, the processor core 110 clears the halt indicator from the operating system and returns to the node 202 to be placed in the active state to process the interrupt. If the heuristic is met, the processor core 110 is placed in a retention state at node 210. In the retention state, the low-power retention voltage is provided to the processor core 110 so that it retains stored information but does not execute normal operations.

In response to a cache message, such as a coherency message or cache probe message, being received by the data processor 102 when the processor core 110 is in the retention state 210, the processor core 110 is placed in a low-power processing state at node 208. The operating voltage of the processor core 110 is set to the low-power processing voltage while it is in the low-power processing state at node 208 so that the cache message can be processed. The processor core 110 remains in the low-power processing state at node 208 until the cache message is processed and the heuristic is met. Once the cache message has been processed and the heuristic is met, the processor core 110 is returned to the retention state at node 210 and the operating voltage is returned to the low-power retention voltage.

In response to an interrupt being received at the data processor 102 while the processor core 110 is in the low-power processing state at node 208 or the retention state at node 210, the processor core 110 is placed in the low-power processing state at node 206. In this state, the operating voltage of the processor core 110 is set to the low-power processing voltage and the interrupt is processed. If a timeout occurs, indicating that the processing of the interrupt is taking more than a specified amount of time, the processor core 110 returns to the active state at node 202 to complete processing of the interrupt. If a halt indication is received when the processor core 110 is in the low-power processing state at node 206, the processor core 110 is placed in the halt state at node 212. In the halt state at node 212 the operating voltage of the processor core 110 remains at the low-power processing voltage.

In the halt state at node 212 the data processor 102 monitors bus transactions on the bus 103 to determine whether they meet a heuristic. The heuristic may be the same as or different from the heuristic associated with the halt state at node 204. If the heuristic is not met the processor core 110 remains in the halt state at node 212. If an interrupt is received, the processor core 110 returns to the active state at node 202 to process the interrupt. If the heuristic is met, the processor core 110 is placed in the retention state at node 210.

Figure 3:
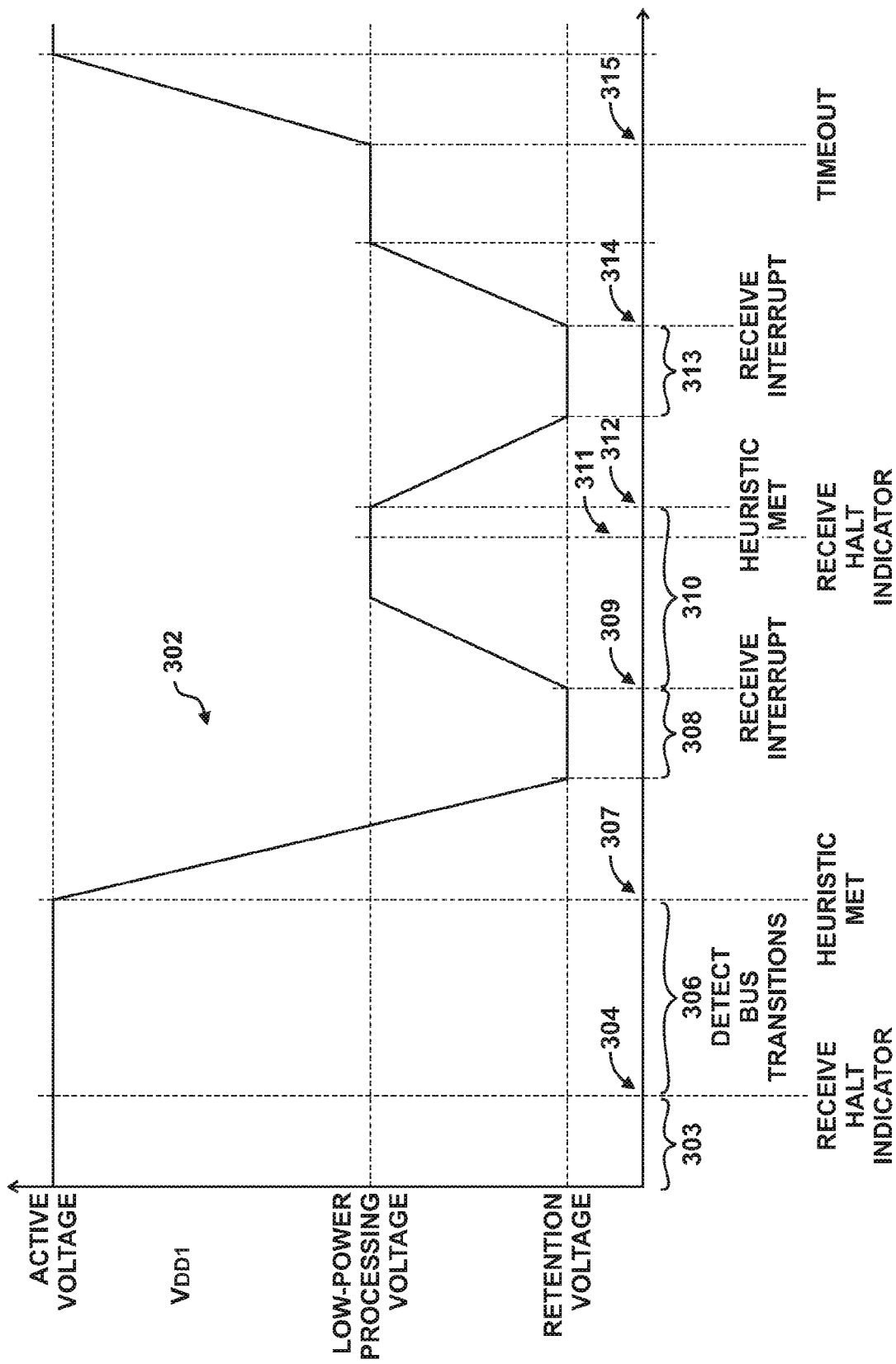
FIG. 3 is a diagram of a particular embodiment of operating voltages provided to a processor core of FIG. 1.

Referring to FIG. 3, a diagram of a particular embodiment of operating voltages provided to the processor core 110 is illustrated. The curve 302 illustrates the level of the operating voltage VDD1 for the processor core 110 over time. During the time period 303, the processor core 110 is in the active state and the operating voltage VDD1 is set to the active voltage level. At time 304, a halt indication is received from the processor core 110. In response, the data processor 102 detects bus transactions on the bus 103. At time 307, the data processor 102 determines, based on the detected bus transactions, that a heuristic has been met. In response, the processor core 110 is placed in the retention state and the voltage VDD1 is set to the low-power retention voltage for time period 308. In a particular embodiment, the time between when the halt indication is received and the beginning of the time period 308 is less than 100 microseconds.

At time 309, the data processor 102 receives an interrupt. In response, the processor core is placed in a low-power processing state and the voltage VDD1 is set to the low-power processing voltage for time period 310. In addition, during time period 310 the interrupt is processed.

At time 311, a halt indication is received at the data processor 102. In response, the data processor 102 determines whether a particular heuristic associated with bus transactions on the bus 103 is met. At time 312, the data processor 102 determines that the heuristic is met. In response, the processor core 110 is placed in the low-power retention state and the operating voltage VDD is set to the low-power retention voltage for time period 313.

At time 314 an interrupt is received at the data processor 102. In response, the processor core 110 is placed in the low-power processing state and the voltage VDD1 is set to the low-power processing voltage so that the interrupt can be processed. At time 315 a timeout occurs, indicating that a halt message has not been received in a specified amount of time. In response, the processor core 110 returns to the active state and the voltage VDD1 is set to the active voltage level.

Figure 4:
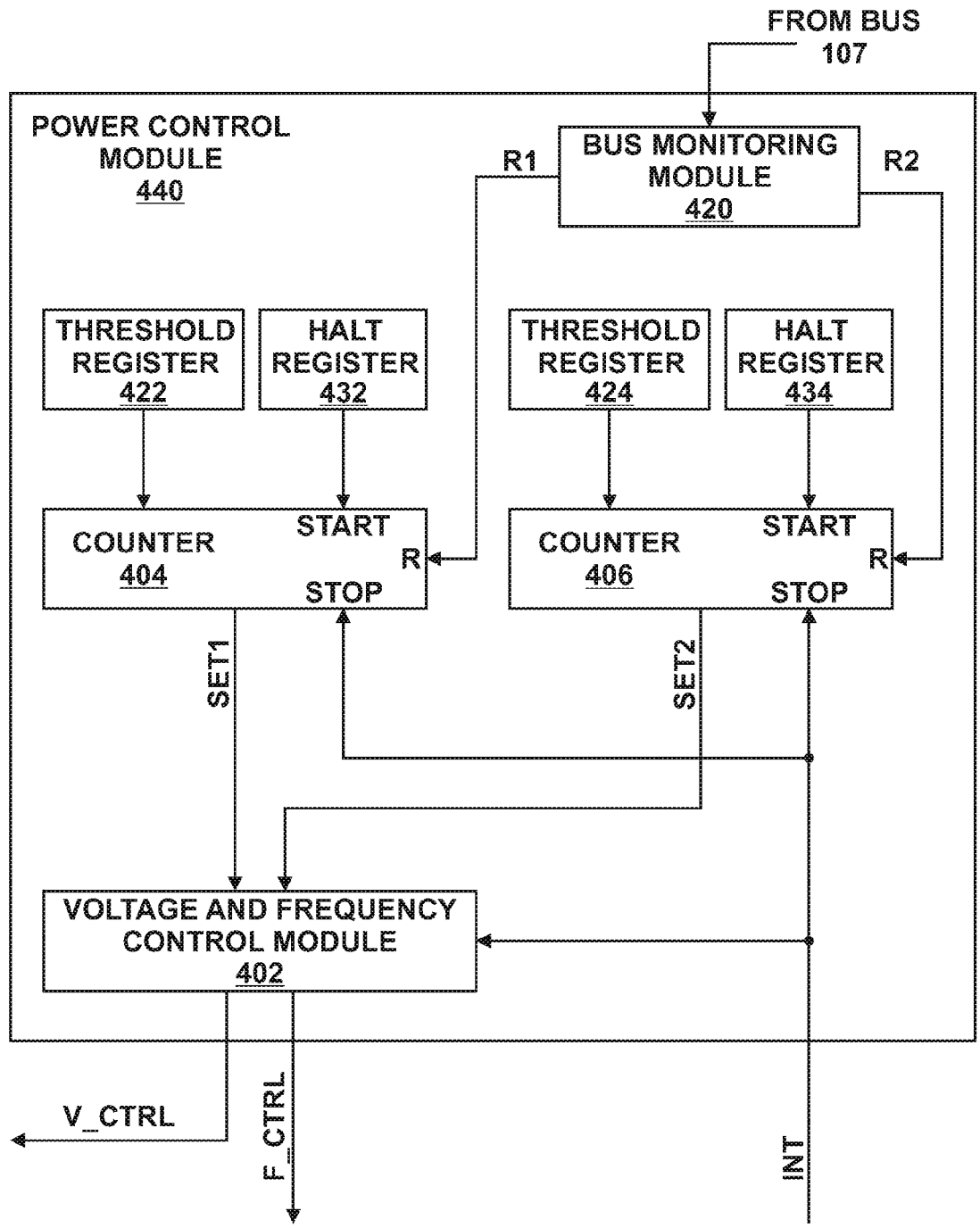
FIG. 4 is a block diagram of a particular embodiment of power control module of FIG. 1.

Referring to FIG. 4, a block diagram of a particular embodiment of power control module 440, corresponding to power control module 140 of FIG. 1, is illustrated. The power control module 440 includes a voltage and frequency control module 402, a counter 404, a counter 406, a bus monitoring module 420, a threshold register 422, a threshold register 424, a halt register 432, and a halt register 434. The voltage and frequency control module 402 includes a first input to receive the signal INT, an input to receive the signal SET1, an input to receive the signal SET2, and an output to provide the signal V_CTRL. The counter 404 includes an input, labeled "START", an input, labeled "R", an input labeled "STOP" to receive the signal INT, a fourth input, and an output to provide the signal SET1. The counter 404 includes an input, labeled "START", to receive the signal HALT2, an input, labeled "R", an input labeled "STOP" to receive the signal INT, a fourth input, and an output to provide the signal SET2. The threshold register 422 includes an output coupled to the fourth input of the counter 404. The threshold register 424 includes an output coupled to the fourth input of the counter 406. The bus monitoring module 420 includes an input coupled to the bus 107, an output coupled to the R input of the counter 404, and an output coupled to the R input of the counter 406. The halt register 432 includes an output coupled to the START input of the counter 404. The halt register 434 includes an output coupled to the START input of the counter 406.

The threshold register 422 is configured to store a value indicating a time threshold associated with the processor core 110. Similarly, the threshold register 424 is configured to store a value indicating a time threshold associated with the processor core 120. The values stored by the threshold registers 422 and 424 can be programmed by the operating system 108, by BIOS of the data processor 102, or otherwise set.

The counter 404 is configured to store a value. In response to information provided at the START input, the counter 404 is configured to periodically adjust (e.g. decrement) the stored value. In response to assertion of a signal at the STOP input the counter 404 is configured to stop adjustment of the stored value. In addition, in response to assertion of a signal at the R input, the counter 404 is configured to load the threshold value provided by the threshold register 422. The counter 404 is further configured to assert the SET1 signal when the stored value reaches a predetermined value (e.g. zero). The counter 406 is configured similarly to the counter 404.

The voltage and frequency control module 402 is configured to provide information via the V_CTRL signal to control the voltage regulator 130 and to provide information via the F_CTRL signal to control the frequencies of clock signals associated with the processor core 110 and the processor core 112. The voltage and frequency control module 402 provides the information represented in the V_CTRL and F_CTRL signals based on information received at its inputs.

The bus monitoring module 120 is configured to monitor bus transactions on the bus 107 and provide information about the monitored transactions at its outputs. For example, in response to detecting a bus transaction of a particular type or associated with a particular processor core, the bus monitoring module 120 can provide information about the bus transaction at its outputs.

During operation, the voltage and frequency control module 402 provides information via the VCTRL signal to set the voltages VDD1 and VDD2 to the active voltage level. In response to the operating system 108 writing information to the halt register 132, indicating that the operating system 108 has issued a halt indication for processor core 110, the counter 404 loads the value provided by the threshold register 422 and periodically decrements its stored value. If the bus monitoring module 120 indicates via that a bus transaction associated with the processor core 110 has been detected on the bus 103, the value stored by the counter 404 is reset to the threshold value and again is periodically adjusted. If the value stored by the counter 404 reaches zero it asserts the signal SET1. Accordingly, in the illustrated embodiment, the counter 404 asserts its output signal in response to no bus transactions associated with the processor core 110 being detected for the amount of time represented by the value stored in the threshold register 422.

In response to assertion of the signal SET1, the voltage and frequency control module 402 provides information via the V_CTRL signal to set the voltage VDD1 to the low-power retention voltage and provides information via the F_CTRL signal to turn off the clock for the processor core 110. Thus, the processor core 110 is placed in the low-power retention mode when the counter 404 indicates no bus transactions associated with the processor core 110 have been detected for the programmed period of time after the halt indication was received.

The counter 406 operates similarly to the counter 404 to assert the signal SET2 in response to no bus transactions associated with the processor core 120 being detected for the programmed period of time indicated by the value stored in the threshold register 424. In response to assertion of the signal SET2, the voltage and frequency control module 402 provides information via the signal VCTRL to set the voltage VDD2 to the retention voltage level and information via the F_CTRL signal to turn off the clock associated with the processor core 120.

In response to the INT signal indicating an interrupt has been received while either the voltage VDD1 or the voltage VDD2 is at the retention voltage level, the voltage and frequency control module 402 sets the voltage VDD1 or VDD2 to the low-power processing voltage level so that the interrupt can be processed. The voltage and frequency control module 402 also sets the appropriate clock frequency for the low-power processing mode via the signal F_CTRL. In addition, in response to the INT signal indicating an interrupt has been received the counters 404 and 406 stop adjusting their stored values.

Figure 5:
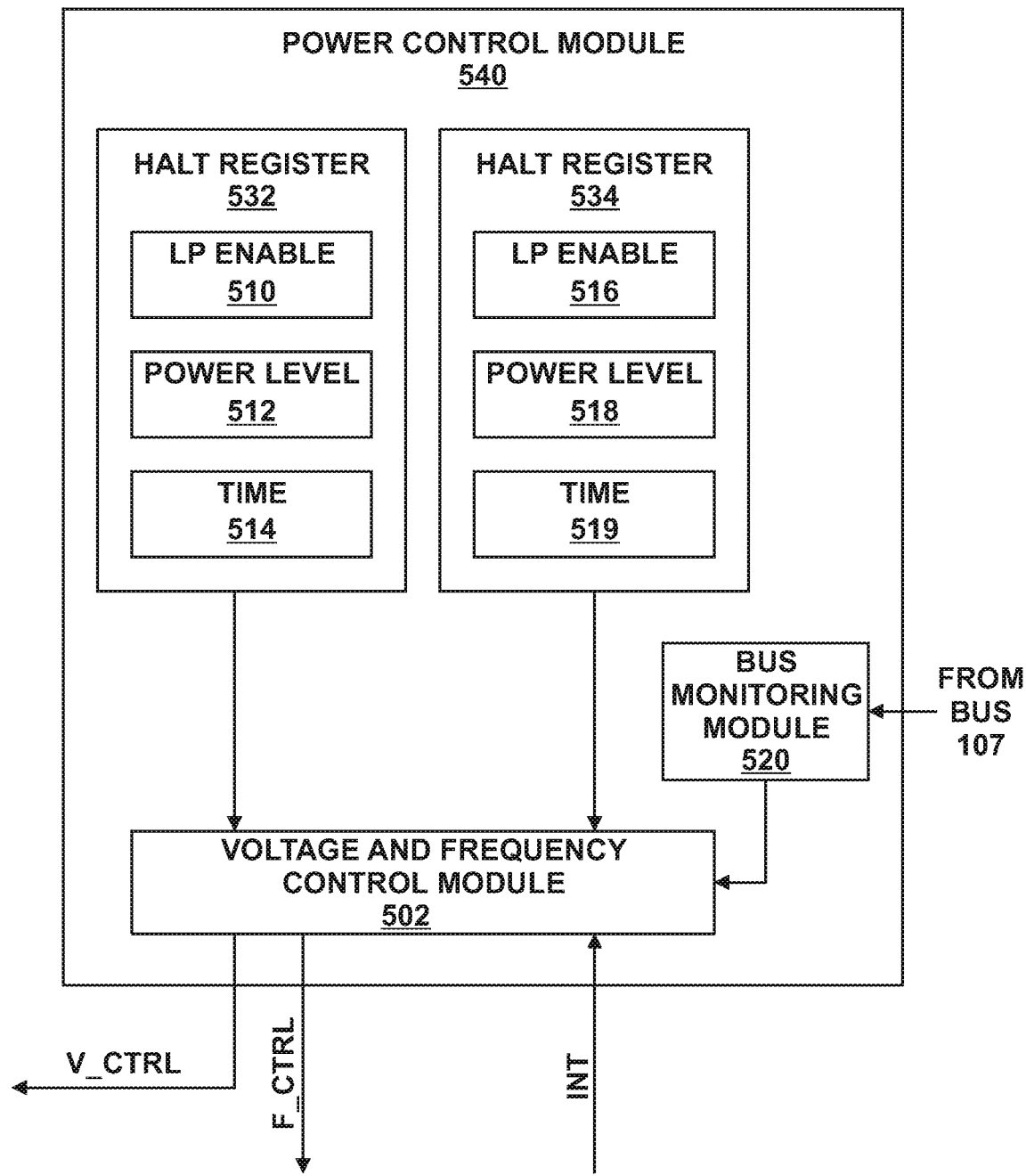
FIG. 5 is a block diagram of an alternative embodiment of the power control module of FIG. 1.

Referring to FIG. 5, a block diagram of an alternative embodiment of power control module 540, corresponding to power control module 140 of FIG. 1, is illustrated. The power control module 440 includes a voltage and frequency control module 502, a bus monitoring module 520, a halt register 532, and a halt register 534. The voltage and frequency control module 502 includes an output to provide the signal V_CTRL, an output to provide the signal F_CTRL, an input connected to the halt register 532, an input connected to the halt register 534, and an input connected to an output of the bus monitoring module 520. The bus monitoring module 520 also includes an input connected to the bus 107.

The voltage and frequency control modules 502 is configured to read information at the halt register 532 and the halt register 534. The voltage and frequency control module 502 is also configured to receive information from the bus monitoring module 520 regarding bus transactions on the bus 107. Based on the read and received information, the voltage and frequency control module 502 provides information via the V_CTRL and F_CTRL signals to set the power mode for the processor core 110 and the processor core 120.

The halt register 532 is configured to store power mode control information for the processor core 110 provided by the operating system 108. The power mode control information includes low-power mode enable information 510, power level information 512, and time information 514. The halt register 516 is configured to store power mode control information for the processor core 120 provided by the operating system 108. The power mode control information stored by the halt register 534 includes low-power mode enable information 516, power level information 518, and time information 519.

During operation, the operating system 108 writes information to the halt register 532 to set the power mode for the processing core 110. The low-power enable information 510 indicates whether a low-power mode is enabled for the processor core 110. The power level information 512 indicates which power mode the processor core 110 should be set to if a heuristic is met. The time information 514 indicates the length of time the processor core 110 will be placed in the low power mode if no interrupts are received. The information stored in the halt register 534 is similarly configured to set the power mode for the processor core 120.

The voltage and frequency control module 502 sets the power mode for the processor core 110 by reading the information stored in the halt register 514. If the low-power enable information 510 indicates that the processor core 110 should be placed in a low-power mode, the voltage and frequency control module evaluates information provided by the bus monitoring module to determine if bus transactions on the bus 107 meet a heuristic. If the heuristic is met, the voltage and frequency control module determines, based on the power level information 512, the level at which the operating voltage and frequency for the processor core 110 should be set. Based on this determination, the voltage and frequency control module 502 provides information via the V_CTRL and F_CTRL signals to set the operating voltage and frequency to the appropriate level. The voltage and frequency control module 502 can also monitor the amount of time that the processor core 110 has been in the low-power mode. When that amount of time exceeds the amount of time indicated by the time information 514, the voltage and frequency control module 502 can set the operating voltage and frequency to place the processor core 110 in another power mode, such as the active power mode.

The voltage and frequency control module 502 can set the power mode for the processor core 120 in a similar fashion as described for the processor core 110, based on the information stored in the halt register 534.

Figure 6:
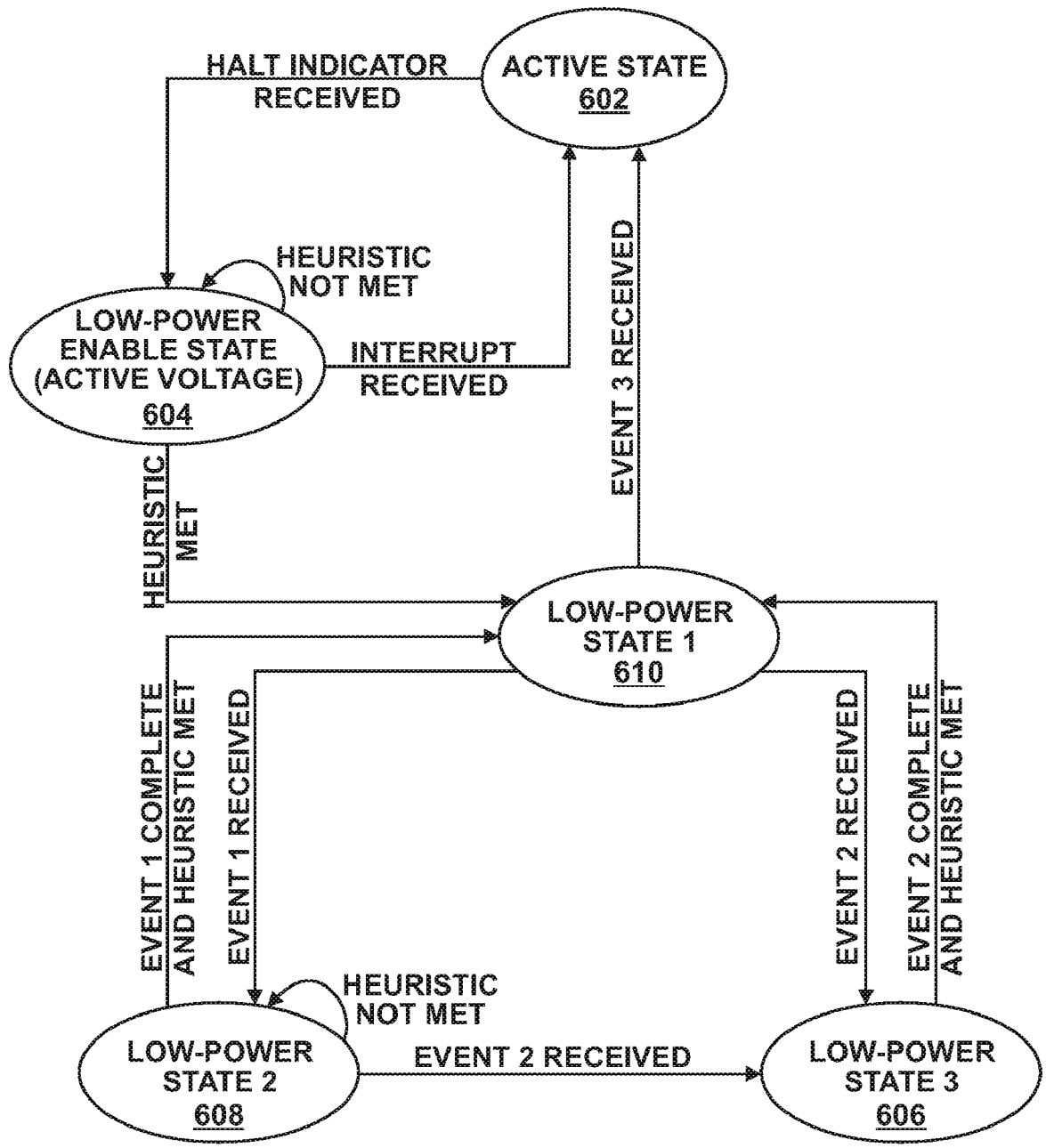
FIG. 6 is a diagram illustrating an alternative embodiment of states of the processor core of FIG. 1.

A specific alternative operational embodiment of the integrated circuit device 100 is illustrated with reference to FIG. 6, which illustrates a state diagram related to power modes of the processor core 110. At node 602, the processor core 110 is in an active state. If a halt indicator is received from an operating system, the processor core 110 is placed in the low-power enable state at node 604. As illustrated, in the low-power enable state at node 604 the active voltage is provided to the processor core 110. As long as a heuristic associated with bus transactions of the integrated circuit device 100 is not met, and no interrupt is received, the processor core 110 remains at the low-power enable state at node 604. If an interrupt is received, the processor core 110 returns to the active state at node 602 to allow the operating system to process the interrupt at normal speed.

If a heuristic is met while the processor core 110 is in the low-power enable state at node 604, the processor core 110 is placed in low-power state 1, at node 610. In low-power state 1, the processor core 110 may be in a retention state, a low-power processing state, or other state where it consumes less power than in the active state at node 602.

If a particular event, illustrated as Event1, is determined at node 610, the processor core 110 is placed in low-power state 2, at node 608. Event1 can be one of a number of events, such as a particular interrupt, timeout condition, and the like. In the low-power state 2, the processor core 110 consumes less power than in the active state at node 602, but may consume more or less power than in the low-power state 1 at node 610. Once Event1 is complete and the heuristic is met, the processor core 110 is returned to the low-power state 1, at node 610.

If, at node 608, a second event, illustrated as Event2, is determined, the processor core 110 is placed in low-power state 3 at node 606. For each of the low-power states 1, 2, and 3, the operating voltage or frequency of the processor core 110 can be different. For example, the operating voltage of the processor core in low-power state 3 may be greater than in low-power state 2 and less than in low-power state 1. However, in each of the low-power states 1, 2, and 3, the processor core 110 consumes less power than in the active state at node 602.

When Event2 is complete and the heuristic is met, the processor core 110 returns to the low-power state 1 at node 610. As illustrated, the processor core 110 can also transition directly from the low-power state 1 at node 610 to the low-power state 3 at node 606 in response to Event2. In addition, in response to another event, Event3, the processor core 110 can transition directly from the low-power state 1, at node 610, to the active state at node 602. Each of the transitions between the low-power states, and the transition from low-power state 1 to the active state are implemented by hardware without intervention by the operating system 108. This provides for fast transition between each low-power state, thereby reducing power consumption.

Other embodiments, uses, and advantages of the disclosure will be apparent to those skilled in the art from consideration of the specification and practice of the disclosure disclosed herein. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method, comprising:
executing first software at a first processor core for a first period, the first processor core in a first power mode for the first period;
providing a first halt indication in response to determining at the first software during the first period that the first processor core can operate in a second power mode, the halt indication indicating the first processor core is to enter a second power mode;
in response to receiving the first halt indication, evaluating at a first hardware module bus transactions associated with a bus during a second period, the first period including the second period; and
in response to determining that the bus transactions meet a first heuristic, providing a first low-power voltage to the first processor core for a third period to place the first processor core in a retention state during the third period.

2. The method of claim 1, wherein providing the first low-power voltage occurs within 100 microseconds of receiving the first halt indication.

3. The method of claim 1, wherein the first software is in an idle mode when the bus transactions associated with the bus are evaluated.

4. The method of claim 1, wherein the first heuristic comprises a number of bus transactions associated with the bus.

5. The method of claim 1, further comprising:
in response to receiving an interrupt during the third period providing a second low-power voltage to the first processor core for a fourth period, the second low-power voltage lower than the first operating voltage and greater than the retention voltage.

6. The method of claim 5, further comprising processing the interrupt at the first processor core during the fourth period.

7. The method of claim 5, further comprising:
in response to receiving a second halt indication during the fourth period, providing the first low-power voltage to the first processor core for a fifth period.

8. The method of claim 5, further comprising:
in response to determining that a second halt indication has not been received during the fourth period, providing the first operating voltage to the first processor core for a fifth period.

9. The method of claim 5, further comprising:
providing a clock signal at a first frequency to the first processor core for the first period; and
providing the clock signal at a second frequency to the first processor during the fourth period, the second frequency less than the first frequency.

10. The method of claim 1, further comprising:
providing a first memory operating voltage to a memory for the first period; and
providing a second memory operating voltage to the memory for a fourth period in response to receiving the first halt indication.

11. The method of claim 10, further comprising determining an amount of time for which no memory transactions associated with the memory are expected, wherein the fourth period corresponds the amount of time.

12. The method of claim 10, further comprising:
providing the first memory operating voltage for a fifth period in response to receiving an interrupt associated with the memory.

13. The method of claim 10, wherein the memory is in a self-refresh state for the fourth period.

14. The method of claim 1, further comprising providing the first operating voltage to a second processor core for the third period.

15. The method of claim 14, further comprising:
providing a first memory operating voltage to a memory for the first period;
providing a second memory operating voltage to the memory for a sixth period in response to receiving the first halt indication and the second halt indication.

16. The method of claim 1, wherein the second period of time is based on a programmable value.

17. A method, comprising:
executing first software at a first processor core for the first period, the first processor core in a first power mode for the first period;
providing a first halt indication in response to determining at the first software during the first period that the first processor core can operate in a second power mode, the halt indication indicating an operating system is to enter an idle state;
in response to receiving the first halt indication, evaluating at a first hardware module bus transactions associated with a bus and associated with the first processor core during a second period, the first period including the second period;
in response to determining that the monitored bus transactions meet a first heuristic, providing a first low-power voltage to the first processor core for a third period to place the first processor core in a retention state during the third period;
providing the first operating voltage to a second processor core for the third period;
executing second software at the second processor core during the third period;
providing a second halt indication in response to determining at the first software during the third period that the second processor core can operate in the second power mode;
in response to receiving the second halt indication, monitoring bus transactions associated with the second processor core during a fourth period, the third period including the fourth period; and
in response to determining that monitored bus transactions associated with the second processor core meet a second heuristic, providing the first low-power voltage to the second processor core for a fifth period.

* * * * *